United States Patent
Cardella et al.

(10) Patent No.: US 12,148,417 B1
(45) Date of Patent: Nov. 19, 2024

(54) LABEL CONFIDENCE SCORING

(71) Applicant: Amazon Technologies, Inc., Seattle, WA (US)

(72) Inventors: Aidan Thomas Cardella, Wellesley, MA (US); Anand Victor, Bellevue, WA (US); Vipin Gupta, Issaquah, WA (US); Zheng Du, Bellevue, WA (US); John Rajiv Malik, Waltham, MA (US); Li Erran Li, Palo Alto, CA (US); Jarrett Alegre Bato, Seattle, WA (US); Peng Yang, Sammamish, WA (US); Alejandro Ricardo Mottini D'Oliveira, Seattle, WA (US)

(73) Assignee: AMAZON TECHNOLOGIES, INC., Seattle, WA (US)

(*) Notice: Subject to any disclaimer, the term of this patent is extended or adjusted under 35 U.S.C. 154(b) by 218 days.

(21) Appl. No.: 17/354,215

(22) Filed: Jun. 22, 2021

(51) Int. Cl.
*G10L 15/01* (2013.01)
*G10L 15/16* (2006.01)
*G10L 15/18* (2013.01)
*G10L 15/26* (2006.01)

(52) U.S. Cl.
CPC ............. *G10L 15/01* (2013.01); *G10L 15/16* (2013.01); *G10L 15/18* (2013.01); *G10L 15/26* (2013.01)

(58) Field of Classification Search
CPC ......... G10L 15/01; G10L 15/16; G10L 15/18; G10L 15/26; G10L 704/232
See application file for complete search history.

(56) References Cited

U.S. PATENT DOCUMENTS

| | | | | |
|---|---|---|---|---|
| 7,149,687 | B1* | 12/2006 | Gorin | G10L 15/063 704/243 |
| 10,331,402 | B1* | 6/2019 | Spector | G10L 15/1815 |
| 11,082,369 | B1* | 8/2021 | Liu | G06F 40/35 |
| 2004/0021685 | A1* | 2/2004 | Denoue | G06F 16/78 715/721 |
| 2006/0149544 | A1* | 7/2006 | Hakkani-Tur | G10L 15/22 704/E15.04 |
| 2009/0063145 | A1* | 3/2009 | Hakkani-Tur | G10L 15/1822 704/E15.001 |
| 2010/0023319 | A1* | 1/2010 | Bikel | G06F 40/169 704/9 |
| 2013/0132080 | A1* | 5/2013 | Williams | G10L 15/01 704/235 |
| 2013/0346409 | A1* | 12/2013 | Welinder | G06F 18/2185 707/737 |
| 2018/0285771 | A1* | 10/2018 | Lee | G06N 20/00 |

(Continued)

*Primary Examiner* — Fariba Sirjani
(74) *Attorney, Agent, or Firm* — K&L Gates LLP

(57) ABSTRACT

Devices and techniques are generally described for confidence score generation for label generation. In some examples, first data may be received from a first computing device. In various further examples, first label data classifying at least one aspect of the first data may be received. First metadata associated with how the first label data was generated may be received. In some cases, the first label data may be generated by a first user. In various examples, a first machine learning model may generate a first confidence score associated with the first label data based at least in part on the first data and second data related to label generation by the first person. In various examples, output data comprising the first confidence score may be sent to the first computing device.

22 Claims, 10 Drawing Sheets

(56) References Cited

U.S. PATENT DOCUMENTS

| | | | | |
|---|---|---|---|---|
| 2019/0034831 A1* | 1/2019 | Perona | ................ | G06F 16/285 |
| 2019/0042894 A1* | 2/2019 | Anderson | .............. | G06N 20/00 |
| 2019/0102656 A1* | 4/2019 | Kwant | ............... | G01C 21/3602 |
| 2021/0035014 A1* | 2/2021 | Dey | ........................ | G06N 3/08 |
| 2021/0042530 A1* | 2/2021 | Kim | ....................... | G06F 18/214 |
| 2021/0210081 A1* | 7/2021 | Park | ........................ | G10L 15/22 |
| 2021/0390958 A1* | 12/2021 | Won | ....................... | G06F 3/0482 |
| 2022/0222952 A1* | 7/2022 | Luo | ........................... | G06T 7/10 |
| 2022/0374420 A1* | 11/2022 | Relan | .................... | G06F 40/117 |

* cited by examiner

LABEL CONFIDENCE SCORING

BACKGROUND

Data may be labeled by humans and/or by automated computer processes to represent and/or categorize the data. For example, an image of a dog may be labeled using metadata that indicates that the image includes a dog and metadata indicating the location of the dog within the image. In another example, audio data representing human speech may be labeled with metadata representing a text transcription of the human speech. The labels may be consumed by various processes. For example, the labels may be used to sort the data. In some other examples, machine learning algorithms may be trained to generate machine learning models using the labels as ground truth data to calculate loss and update the model to minimize the loss.

DETAILED DESCRIPTION

Figure 1:
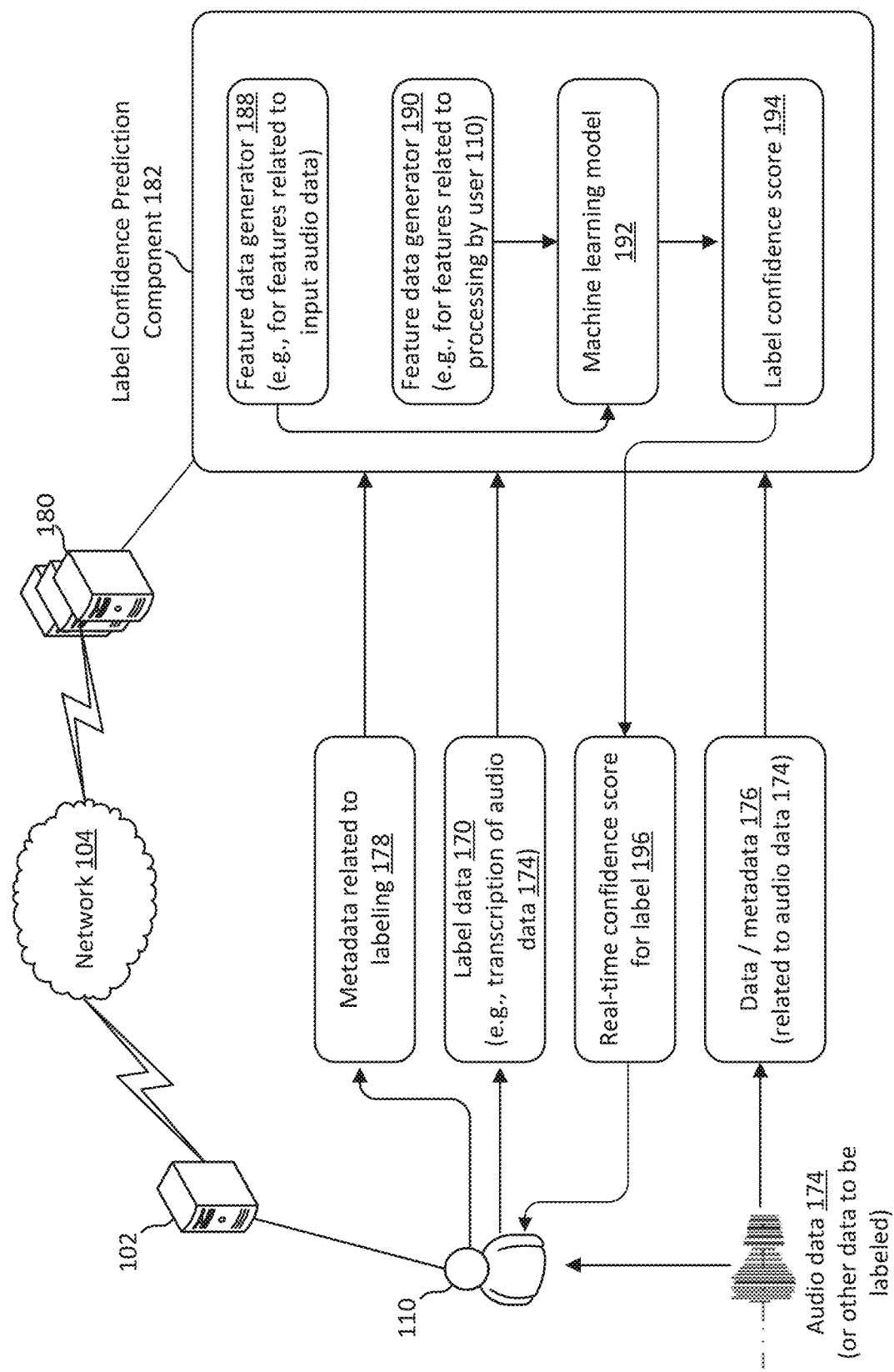
FIG. 1 is a diagram illustrating an example of label confidence scoring, in accordance with various aspects of the present disclosure.

In the following description, reference is made to the accompanying drawings that illustrate several examples of the present invention. It is understood that other examples may be utilized and various operational changes may be made without departing from the scope of the present disclosure. The following detailed description is not to be taken in a limiting sense, and the scope of the embodiments of the present invention is defined only by the claims of the issued patent.

Data labeling is a common task for a wide variety of use cases. For example, machine learning algorithms are often trained using supervision signals comprising labeled training data. For example, there may be a goal to train a convolutional neural network to detect dogs in input images. Initially, upon instantiation, the model may not perform very well. However, by providing the model with a large corpus of training data that includes some images with dogs labeled with the classification label "dog" (and some images without dogs) and bounding box data identifying the location of the dog(s) in the image(s), the model may learn to detect dogs in images with a high degree of accuracy. Accordingly, providing labeled image data (e.g., images that include bounding boxes identifying the location of dogs along with a classification label (e.g., "dog")) can be an important part of supervised machine learning algorithms.

Supervised learning is used in a wide variety of contexts. Machine learning techniques, such as those described herein, are often used to form predictions, solve problems, recognize objects in image data for classification, etc. For example, machine learning techniques may be used to detect the location and class of objects represented in images, may determine text transcriptions of spoken audio, may categorize data and/or predict outcomes, etc. In various examples, machine learning models may perform better than rule-based systems and may be more adaptable as machine learning models may be improved over time by retraining the models as more and more data becomes available. Additionally, machine learning systems may be able to handle non-linearities in the data and other complex interactions between many input signals. Accordingly, machine learning techniques are often adaptive to changing conditions. Deep learning algorithms, such as neural networks, are often used to detect patterns in data and/or perform tasks.

Generally, in machine learning models, such as neural networks, parameters control activations in neurons (or nodes) within layers of the machine learning models. The weighted sum of activations of each neuron in a preceding layer may be input to an activation function (e.g., a sigmoid function, a rectified linear unit (ReLu) function, etc.). The result determines the activation of a neuron in a current layer. In addition, a bias value can be used to shift the input of the activation function to the left or right on the x-axis and thus may bias a neuron toward activation.

Generally, in machine learning models, such as neural networks, after initialization, annotated training data (e.g., data including labels) may be used to generate a cost or "loss" function that describes the difference between expected output of the machine learning model and actual output. The parameters (e.g., weights and/or biases) of the machine learning model may be updated to minimize (or maximize) the cost. For example, the machine learning model may use a gradient descent (or ascent) algorithm to incrementally adjust the weights to cause the most rapid decrease (or increase) to the output of the loss function. The method of updating the parameters of the machine learning model is often referred to as back propagation.

Labeling of data also has applicability in non-machine learning contexts. For example, medical treatments and/or diagnoses may be categorized (e.g., labeled) for insurance purposes to determine coverage and/or payments. In various examples, such labeling may be performed using heuristics or using a machine learning approach. In general, label data may include any metadata describing other data that distinguishes, categorizes, and/or classifies that data.

Automated systems and techniques can automatically label data. In these systems, confidence scores can be generated that indicate the algorithm's confidence in the accuracy of the predicted label for the underlying data. Such label confidence scores may be consumed in a variety of ways. For example, the label confidence scores may be used during training to update the model (e.g., training instances having higher confidence scores may be more highly weighted relative to training instances having lower confidence scores). In other examples, training instances with label confidence scores below a threshold confidence score may be excluded from the training corpus. Similarly, training instances with label confidence scores above a threshold confidence score may be grouped together into a training corpus. In still other examples, in rule based systems, data having low-confidence labels may be subjected to a heightened level of scrutiny and/or may be disregarded. There are many other possible applications of such label confidence scores beyond those specifically mentioned herein.

In addition to machine-labeling, human labeling can be used for some applications. Human-in-the-loop systems can involve users editing or otherwise influencing a machine's prediction, such as by generating labels where the machine is not confident in its prediction and/or where there is disagreement among the predictions of multiple machines/algorithms. Further, human labeled data can be used to train the algorithms that perform automatic labeling. Generating viable confidence scores for human-generated labels is materially more complex relative to machine-generation of label confidence scores. For example, a machine-generated label confidence score may be generated based on confidence intervals and/or simply using a Softmax output of the model. By contrast, simply asking a human labeler to assess their own confidence in a label is subjective and is prone to variability and/or error. In some machine-assisted technologies that assist human-labelers (e.g., "users") in data-labeling tasks, hypothesized labels may be provided that are adjusted and/or corrected by the users. Described herein are techniques for predicting real-time confidence scores for human-generated labels based on features representing both the data being labeled, the context (e.g., timing information, location information), and information about the particular user and/or the labeling process (e.g., how the label data was generated by a user and/or labeling system) as well as the coherence of the generated label. The various label confidence score prediction techniques described herein may promote labeling quality and/or efficiency and may be used in a variety of applications—some of which are described herein for illustrative purposes.

In order to present a concise example that can be used to illustrate some aspects of the techniques and/or systems described herein, a text transcription of audio labeling task is described throughout the disclosure. For example, a human user may be tasked with labeling audio data that represents human speech. The task may be to provide a text transcription of the audio data. The various systems and/or techniques described herein may be effective to generate a confidence score for the human-generated label (e.g., the text transcription—in this case). Although this example is described and referred to repeatedly herein, it should be appreciated that the systems and/or techniques described herein are applicable in a wide variety of other contexts. Indeed, the systems and/or techniques described herein may be used with any data labeling task performed by humans.

FIG. 1 is a diagram illustrating an example of label confidence scoring, in accordance with various aspects of the present disclosure. In various examples, a user 110 may interact with a computing device 102 via an interface. The user 110 may be, for example, a user tasked with labeling data. For example, the user 110 may be tasked with labeling audio data 174 (or other data to be labeled). In the depicted examples, the audio data 174 may be data representing human speech.

Computing device 102 may be, for example, a mobile device (e.g., a smart phone, a laptop, etc.), a wearable device, a desktop computing device, a computing device comprising a virtual assistant, an embedded system, etc. In various examples, computing device 102 may be effective to communicate with one or more remote devices via a network 104 (e.g., a wide area network (WAN) such as the Internet). In the example depicted in FIG. 1, computing device 102 may communicate with label confidence prediction component 182.

The user 110 may generate label data 170 representing a text transcription of the audio data 174 (in the current example). The label data 170 may be sent to label confidence prediction component 182. Additionally, in some examples, information about the audio data 174 (e.g., the data being labeled) may be sent to the label confidence prediction component 182 as data/metadata 176. Data/metadata 176 may include, for example, metadata describing a time when the audio data 174 was generated (e.g., when human speech was captured by a speech-processing enabled device), a location of a device (e.g., geolocation data) that captured the audio data 174, a device type of the device generating the audio data 174, waveform data of the audio, a mel-spectrogram representing the audio data 174, a compressed and/or otherwise encoded representation of the audio data 174, etc.

Label confidence prediction component 182 may perform various pre-processing tasks and/or may determine various feature data that may be used as inputs into a machine-learning model 192 that may generate a label confidence score 194 (e.g., a prediction score) for the label data 170. The specific set of input features used may be implementation specific. However, various example features are described herein.

In the example of FIG. 1, the input features may be generated from metadata that can be broadly separated into two classes. A first class of features may be generated by feature data generator 188 (e.g., using data/metadata 176). For example, feature data generator 188 may generate numerical data representations of various aspects of the underlying data being labeled (and/or data representations of the underlying data being labeled). In other examples, features may be strings (e.g., "DA location: Boston") and/or other types of structured or unstructured data. For example, feature data generator 188 may generate feature data representing the audio data 174 (e.g., data representing the data/metadata 176). Such features may represent timing information, location information, device type information, audio data information, audio quality information, image quality information (e.g., when the labeling task is related to images or video), information about the content of the data, etc., depending on the desired implementation. In some other examples, the feature data generator 188 may generate feature data representing the label generated by the user. In some examples, feature data generator 188 may combine (e.g., concatenate) the various features prior to input into the machine learning model 192, while in other examples, the features may be separately input. Although, feature data generator 188 is depicted in FIG. 1, in some example implementations the data/metadata 176 may be directly consumed by the machine-learning model 192 as input features without preprocessing.

A second class of features may be generated from metadata related to labeling 178 by feature data generator 190.

For example, feature data generator 190 may generate feature data related to processing by the user 110. For example, the feature data may be generated using metadata that indicates how the user 110 generated the label. For example, feature data representing past labeling performance (e.g., historical accuracy of label data) of the particular user (e.g., the user 110) may be generated. The past performance may be quantified in terms of label accuracy (e.g., as determined using post hoc analysis of the label and the underlying data). Metadata related to labeling 178 may include data describing the current and/or historical process of labeling by user 110. For example, actions taken by user 110 during the labeling of audio data 174, an amount of time taken by user 110 to label the audio data 174, historical accuracy of labels generated by user 110, etc. In various examples, such past performance features may be further delineated based on aspects and/or qualities of the underlying data (e.g., audio data 174 in the current example). For example, it may be known (e.g., via metadata) that the audio data 174 includes a question about music. The user may have exhibited excellent performance in transcriptions related to music in the past. This information may be quantified by feature data generator 190 into a numerical representation (e.g., a vector or tensor). In another example, there may be metadata indicating that the audio data 174 is in a first spoken language or dialect. There may be information about the user indicating poor performance for the relevant dialect/spoken language. Feature data generator 190 may generate feature data quantifying this information for input into the machine-learning model 192. In some other examples, feature data generated by feature data generator 190 may indicate a length of the audio, a complexity of the labeling task, an estimated number of words related to the labeling task, a time of day at which the user is generating the label (and associated performance levels at that time of day), subject matter of the audio, a signal-to-noise ratio of the audio, a number of times that the user listened to the audio, the amount of time taken by the user 110 to label audio, whether the user used a search engine while evaluating the input data, etc. Various features may be generated using feature data generator 190. In general, such features may relate to historical performance by the user and/or performance data cross referenced with particular qualities of the data to be labeled (e.g., the audio data in the current example).

The foregoing examples of feature data generated by the feature data generator 188 and the feature data generator 190 are merely illustrative. The particular set of features used for label confidence prediction are implementation specific. Various example features are also discussed below. Example features may include automatic speech recognition (ASR) system (e.g., ASR component 250 described below) data output by a system effective to automatically transcribe the speech in the audio data 174. For example, data describing a length of time taken for the ASR system to transcribe the audio data 174, an automatically-generated confidence score of the ASR system's output, the number of different ASR hypotheses generated, etc. Other examples of features may determine a domain of the utterance represented by the audio data 174 and the user 110's past performance with respect to that domain (e.g., shopping domain, automated home control domain, music domain, etc.). Other example features may include data related to actions performed by the user 110 during labeling (e.g., did the user 110 click on a help tool, did the user 110 listen to the audio multiple times, did the user 110 modify their transcription several times, etc.). In some other examples, data of the label itself may be evaluated to determine label confidence. For example, in the transcription example being described in reference to FIG. 1, the transcription label may be evaluated (e.g., using a language model) to determine if the transcription is grammatically coherent and/or includes misspellings, etc. In various examples, words of the transcription label (and/or sequences of words) may be compared to words/sequences of words in transcriptions that have been verified as being correct. Other features may include a signal indicating that a machine transcription was inaccurate. For example, a subsequent user interruption after a speech processing system has processed an utterance to take an action may indicate that the ASR transcription of the utterance was incorrect. Accordingly, the user 110 may also have trouble processing such utterances. In general, the features used for label confidence scoring may depend on the particular implementation and/or context.

The machine learning model 192 may be implemented using various different machine learning algorithms. For example, an ensemble of gradient boosted trees may be used, a neural network or other deep-learning model, random forest, regression techniques, etc., depending on the desired implementation. In various other examples, consensus transcriptions of multiple users may be used as "correct" (e.g., ground truth) labels that may be used to build the cost function used to train a supervised machine learning model. For example, training instances may include values for a set of features associated with generation of a ground truth correct label (e.g., a label verified by multiple individuals). Accordingly, the supervised machine learning model may learn various combinations of input features that are associated with ground truth correct labels. In some examples, negative training instances may be provided as well (e.g., training instances with incorrect labels). Accordingly, the supervised machine learning model may learn various combinations of input features that are associated with incorrect labels. In various other examples, unsupervised approaches may involve rule-based systems and/or coherence scores (e.g., by comparing a text label to known grammatical structures, dictionaries, and/or vocabularies). In general, the machine learning model 192 may take as input the feature data output by feature generator 188 and feature generator 190 to generate a label confidence score 194. As shown in FIG. 1, the label confidence score 194 may be continuously generated as the user 110 types (or otherwise provides) the label data 170 and may be output in real time (e.g., as real-time confidence score for label 196). Accordingly, the label confidence score 194 may be updated as the user types (e.g., the label confidence score 194 may increase as the user corrects a spelling error in a transcription and/or may decrease as the user makes spelling and/or grammatical errors).

Further, different versions of the machine learning model 192 may be used to generate label confidence scores 194 at different times. For example, a baseline machine learning model 192 may be used to generate a label confidence score 194 for a given data sample prior to receiving a human-generated label for that sample. Such a baseline machine learning model 192 may predict the confidence score for the label based on historical data related to processing data samples by the human user that is assigned for the current sample. In another example, a real-time machine learning model 192 may generate confidence scores for labels as the user is providing the label. For example, as a user types a text transcription of an audio sample, the real-time machine learning model 192 may generate confidence scores for the label in real time. The real-time machine learning model 192 may use the data entered so far by the user as an input feature along with information about the data sample itself (e.g., the features computed by the feature data generator 188 in the example depicted in FIG. 1). In another example, a post hoc machine learning model 192 may generate a confidence score for the label after the user has finished labeling the data sample (e.g., after the user has submitted the sample). In such examples, the various features computed and/or received by the feature data generators 188, 190 (described above) may be used. Accordingly, the different versions of the machine learning model 192 may use different sets of features depending on what features are available at the time the machine learning model 192 is called.

Figure 2:
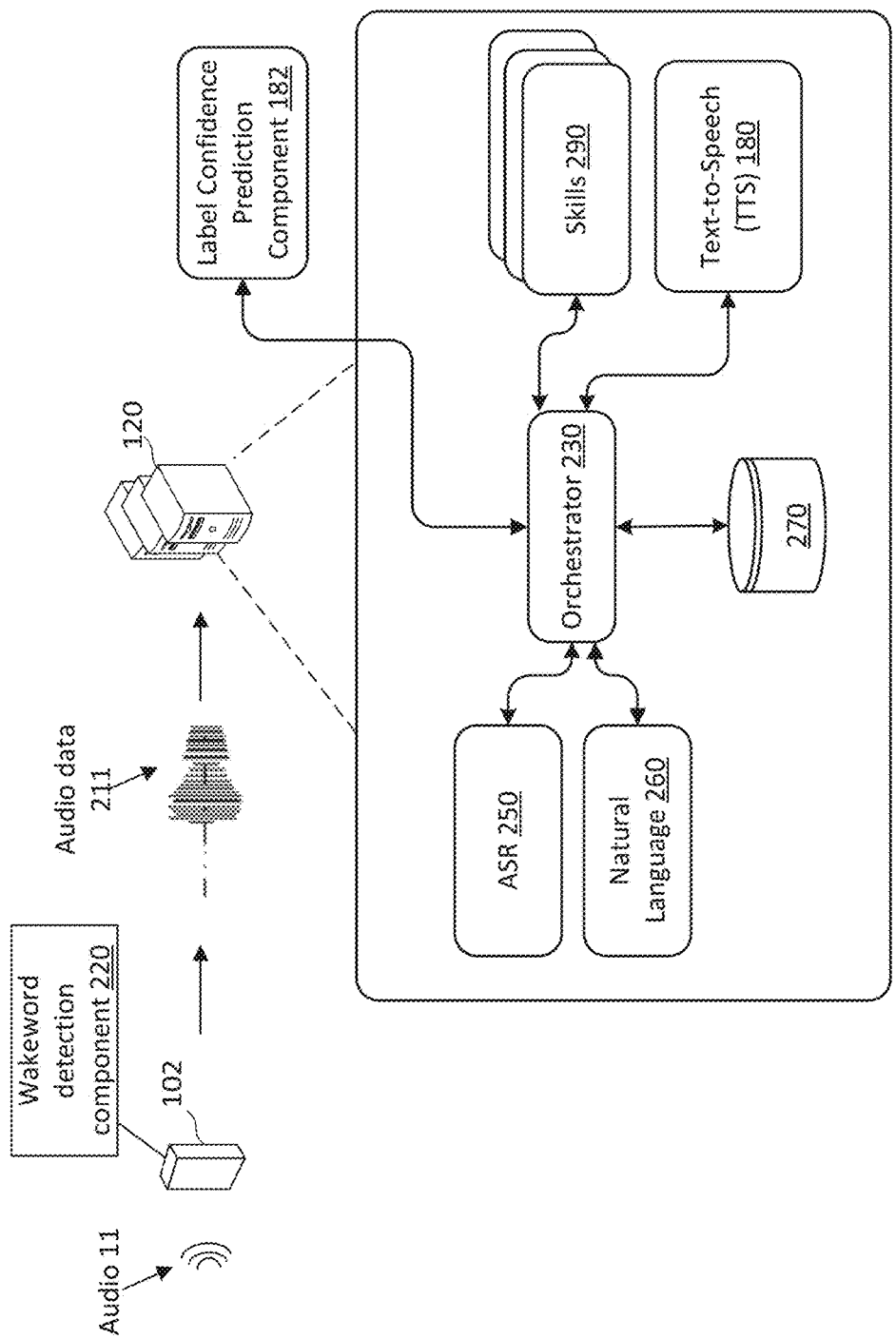
FIG. 2 is a block diagram of a natural language processing system that may include or be used with a label confidence prediction component, in accordance with various aspects of the present disclosure.

FIG. 2 is a block diagram of a natural language processing system 120 that may include or be used with a label confidence prediction component 182, in accordance with various aspects of the present disclosure. Automatic speech recognition (ASR), as described herein, is a field of computer science, artificial intelligence, and linguistics concerned with transforming audio data associated with speech into text data and/or other ASR output data representative of that speech. Natural language understanding (NLU) is a field of computer science, artificial intelligence, and linguistics concerned with enabling computers to derive meaning from text input containing natural language. In many examples, the natural language input data (e.g., a user utterance and/or input text) may result in specific semantic intent data representing a semantic interpretation of the text. In some examples, the semantic intent data is actionable to cause the natural language processing system and/or a natural language processing application (referred to herein as a "skill") to perform an action. Generally, semantic intent data may represent a goal of a user in making the particular utterance. In some examples, the semantic intent data may include executable commands or other type of instructions that may be used to take some action related to the speech processing system's understanding of the user's request. Thereafter one or more of the semantic intents may be selected for further processing and/or output by the NLU system. For example, the semantic intent associated with the highest confidence score among the different semantic intents generated may be selected for further processing and/or output.

Text-to-speech (TTS) is a field of computer science, artificial intelligence, and linguistics concerned with enabling computers to output synthesized speech. ASR, NLU, and TTS may be used together as part of a natural language processing system. In some examples, other types of input apart from spoken utterances may be received by a natural language processing system. For example, text, visual input (e.g., facial recognition and/or hand recognition), haptic input, and/or other types of input may be received and/or processed by a natural language processing system.

Spoken language understanding (SLU) is a field of computer science, artificial intelligence, and/or linguistics that receives spoken language as an input, interprets the input, and generates executable commands that may be executed by one or more other computing devices and/or speech processing components. In various examples, spoken language understanding may be a combination of ASR systems and NLU systems, while in other examples, spoken language understanding may be a single model or other type of component effective to perform the functions of both ASR and NLU or otherwise take audio data as an input and output executable commands or other types of instructions representing the meaning of the audio data. In various further examples, SLU may include TTS where a machine learning model may receive input audio data (e.g., request data representing user request data and/or user text input data) and may generate output audio data in response to the utterance.

As used herein, user utterances, input text data, and/or any form of data input to a natural language processing system ("input data") may be described by "natural language inputs" and/or simply "inputs." Such request data may change forms many times during processing of the request data by various components of the speech processing system. For example, initially the input data may be audio data and/or input text data representing a user question. The audio data may be transformed into text data and/or other ASR output data by an ASR component of the speech processing system. The text data and/or other ASR output data may be transformed into intent data by an NLU component of the speech processing system.

Intent data may be used by a skill to perform an action (e.g., to generate action data and/or other skill output that may be processed in order to take some corresponding action such as answering a user's question, playing video, playing audio, etc.). NLU processing may be used to determine that the user wants a particular song to be played, book to be read, action to be performed, etc. Accordingly, as described in further detail below, a user may use a particular intent and/or skill to cause user-identified text (e.g., a book) to be read (using TTS component 180).

Natural language inputs may refer to any data related to an input request to a speech processing system (e.g., including the various data forms described above, as each of the aforementioned data types relate to an input request to the speech processing system). In general, as used herein, skills may be any software (and/or combination of software and hardware) used during speech processing to take an action in response to input request data (e.g., natural language inputs such as user utterances and/or text).

In various examples, speech processing systems may determine an intent for particular natural language input according to an interpretation of the natural language input determined by NLU. In various examples, multiple NLU process flows may be executed for a given natural language input, as some process flows may be more effective in deriving semantic meaning from particular types of utterances and/or other natural language inputs. For example, a primary NLU process flow may comprise a rule-based heuristic system utilizing knowledge graphs and/or ontological configurations that have been coded in advance. The primary NLU process flow may use a process known as named entity recognition (NER) to identify entities (e.g., nouns and/or pronouns) in a given natural language input. The entites and/or other semantic language data of a natural language input may be parsed and sent to the knowledge graph, which, in turn, may be used to relate different objects and/or attributes of those entites (data describing characteristics of the entities) to one another.

In various examples, NLU systems and/or components described herein may be multi-modal as the NLU systems may be effective to process other types of inputs besides input natural language data (e.g., text and/or speech). For example, multi-modal NLU systems may be effective to process image data and/or video data to determine visual feature data that semantically represents objects included in the image data. As described in further detail below, multi-modal transformer models may be machine learning models that are effective to take both natural language data and image data as inputs in order to perform some task. In various examples, at least some of the machine learning models of the natural language processing system 120 may be trained using supervised learning, and may thus use labeled training data. The label confidence prediction component 182 may generate confidence scores for the labels generated by human users. The confidence scores may be used as inputs to the various machine learning models during training and/or may be used to filter and/or pre-process the training data corpus. For example, as described above, in some examples, a particular model may only be trained with training data instances associated with label confidence scores that exceed a particular threshold value. In another example, a training dataset may be constructed using a variety of different confidence score data. For example, there may be a requirement when creating the training dataset that at least 50% of the training samples are associated with confidence scores above 0.8, while at least 15% of the training samples are associated with confidence scores below 0.25. In another example, to-be-labeled data may be routed to users that historically are associated with high confidence scores for labeling data of the particular type. Additionally, various signals from the natural language processing system 120 may be used to compute feature data used by the label confidence prediction component 182. For example, in the transcription label example described above in reference to FIG. 1, a signal indicating the ASR transcription of particular input audio, the machine-generated confidence score associated with the transcription (e.g., generated by the ASR component 250), data indicating a number of different ASR hypotheses generated for a particular utterance, a length of processing time for a particular utterance, etc., may be sent from the natural language processing system 120 (e.g., from the ASR component 250) to the label confidence prediction component 182. Such signals may be used as features (at least in part) to determine a confidence score for a human-generated label (e.g., a human generated transcription of the same audio data). Further, while many of the examples described herein are with respect to ASR processing, the label confidence prediction component 182 may generate confidence in labels that may be consumed by other machine-learning models of the natural language processing system 120. For example, NLU component 260 may comprise a variety of different models that may consume labeled training data during training. In at least some examples, a human user may generate one or more of such labels. Accordingly, the label confidence prediction component 182 may be used to generate confidence scores for such labels.

Introduced above, the natural language processing system 120 may be configured to support speech interactions with one or more users and respond to user requests. For instance, a user may verbally request the natural language processing system 120 to perform a particular task, such as to play an audio file of text for the user. The one or more microphones 162 may capture sound associated with the user speech. In some examples, the user may indicate a request by prefacing the request with a predefined keyword, such as a wake word or trigger expression. The natural language processing system 120 may capture user speech and may process the user speech to identify a command. Speech processing, such as automatic speech recognition (ASR), natural language understanding (NLU), and speech synthesis may also be performed. However, in some instances, one or more remotely coupled computing device may perform the speech processing and transmit a response (or data) back to the natural language processing system 120. Upon identifying the command, the natural language processing system 120 may output a response, cause actions to be performed (e.g., playing music or ordering movie tickets), or elicit feedback from the user. In some instances, content identified in this manner may be played through the display and/or the loudspeakers of the natural language processing system 120. However, the natural language processing system 120 may also be configured to provide the content to peripheral devices such as Bluetooth loudspeakers or other peripherals that are nearby or in wired or wireless communication with the natural language processing system 120. For example, in some instances, the natural language processing system 120 may be configured to play music and/or output synthesized speech using a home audio system.

An audio capture component(s), such as a microphone or array of microphones of the computing device 102, captures audio 11. The computing device 102 processes audio data, representing the audio 11, to determine whether speech is detected. The computing device 102 may use various techniques to determine whether audio data includes speech. Some embodiments may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the computing device 102 may implement a limited classifier configured to distinguish speech from background noise. The classifier may be implemented by techniques such as linear classifiers, support vector machines, and decision trees. In still other examples, Hidden Markov Model (HMM) or Gaussian Mixture Model (GMM) techniques may be applied to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11, the computing device 102 may use a wakeword detection component 220 to perform wakeword detection to determine when a user intends to speak an input to the computing device 102. This process may also be referred to as keyword detection, with a wakeword being a specific example of a keyword. An example wakeword is "Alexa," "Computer," etc.

Wakeword detection is typically performed without performing linguistic analysis, textual analysis, or semantic analysis. Instead, the audio data representing the audio 11 may be analyzed to determine if specific characteristics of the audio data match preconfigured acoustic waveforms, audio signatures, or other data to determine if the audio data "matches" stored audio data corresponding to a wakeword. The stored audio data may be provided by the natural language processing system 120 and/or may be provided by the user.

The wakeword detection component 220 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword spotting builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 220 may be built on deep neural network (DNN)/recursive neural network (RNN) structures directly, without HMM being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once the wakeword is detected, the computing device 102 may wake and begin transmitting audio data 211, representing the audio 11, to the natural language processing system 120. The audio data 211 may include data corresponding to the wakeword, or the portion of the audio data 211 corresponding to the wakeword may be removed by the computing device 102 prior to sending the audio data 211 to the natural language processing system 120.

Upon receipt by the natural language processing system 120, the audio data 211 may be sent to an orchestrator component 230. The orchestrator component 230 may include memory and logic that enable the orchestrator component 230 to transmit various pieces and forms of data to various components of the system, as well as perform other operations. The orchestrator component 230 sends the audio data 211 to an ASR component 250. The ASR component 250 transcribes the audio data 211 into text data. The text data output by the ASR component 250 represents one or more than one (e.g., in the form of an N-best list) hypotheses representing speech represented in the audio data 211. The ASR component 250 interprets the speech in the audio data 211 based on a similarity between the audio data 211 and pre-established language models. For example, the ASR component 250 may compare the audio data 211 with models for sounds (e.g., subword units, such as phonemes, etc.) and sequences of sounds to identify words that match the sequence of sounds of the speech represented in the audio data 211. The ASR component 250 sends the text data generated thereby to an NLU component 260, for example via the orchestrator component 230. The text data sent from the ASR component 250 to the NLU component 260 may include a top scoring ASR hypothesis or may include an N-best list including multiple ASR hypotheses. An N-best list may additionally include a respective score associated with each ASR hypothesis represented therein. Each score may indicate a confidence of ASR processing performed to generate the ASR hypothesis with which the score is associated.

The NLU component 260 attempts to make a semantic interpretation of the phrases or statements represented in the text data input therein. That is, the NLU component 260 determines one or more meanings associated with the phrases or statements represented in the text data based on words represented in the text data. The NLU component 260 determines an intent (e.g., intent data) representing an action that a user desires be performed as well as pieces of the input text data that allow a device (e.g., the computing device 102, the natural language processing system 120, the gateway system, etc.) to execute the intent. For example, if the text data corresponds to "call John," the NLU component 260 may determine an intent that the system establish a two-way communication channel between the computing device 102 originating the call and a device of the recipient "John." For further example, if the text data corresponds to "tell John I am on my way," the NLU component 260 may determine an intent that the system send a message to a device of the recipient "John," with the message corresponding to "I am on my way."

The NLU component 260 outputs NLU results to the orchestrator component 230. The NLU results may include an NLU hypothesis, including a representation of an intent and corresponding slotted data that may be used by a downstream component to perform the intent. Alternatively, the NLU results data may include multiple NLU hypotheses, with each NLU hypothesis representing an intent and corresponding slotted data. Each NLU hypothesis may be associated with a confidence value representing a confidence of the NLU component 260 in the processing performed to generate the NLU hypothesis associated with the confidence value.

The orchestrator component 230 may send the NLU results to an associated skill component 290. If the NLU results include multiple NLU hypotheses, the orchestrator component 230 may send a portion of the NLU results corresponding to the top scoring NLU hypothesis to a skill component 290 associated with the top scoring NLU hypothesis.

A "skill" or "skill component" may be software running on the natural language processing system 120 that is akin to a software application running on a traditional computing device. That is, a skill component 290 may enable the natural language processing system 120 to execute specific functionality in order to perform one or more actions (e.g., provide information to a user, display content to a user, output music, or perform some other requested action). The natural language processing system 120 may be configured with more than one skill component 290. For example, a weather skill component may enable the natural language processing system 120 to provide weather information, a ride sharing skill component may enable the natural language processing system 120 to schedule a trip with respect to a ride sharing service, a restaurant skill component may enable the natural language processing system 120 to order food with respect to a restaurant's online ordering system, a communications skill component may enable the system to perform messaging or multi-endpoint communications, etc. A skill component 290 may operate in conjunction between the natural language processing system 120 and other devices such as the computing device 102 in order to complete certain functions. Inputs to a skill component 290 may come from various interactions and input sources.

The functionality described herein as a skill or skill component may be referred to using many different terms, such as an action, bot, app, application, speechlet or the like. A skill component 290 may include hardware, software, firmware, or the like that may be dedicated to the particular skill component 290 or shared among different skill components 290. A skill component 290 may be part of the natural language processing system 120 (as illustrated in FIG. 2) or may be located at whole (or in part) with one or more separate systems. Unless expressly stated otherwise, reference to a skill, skill device, or skill component may include a skill component operating within the natural language processing system 120 (for example as skill component 290) and/or skill component operating within a system separate from the natural language processing system 120.

A skill component 290 may be configured to perform one or more actions. A skill may enable a skill component 290 to execute specific functionality in order to provide data or produce some other output requested by a user. A particular skill component 290 may be configured to execute more than one skill. For example, a weather skill may involve a weather skill component providing weather information to the natural language processing system 120, a ride sharing skill may involve a ride sharing skill component scheduling a trip with respect to a ride sharing service, an order pizza skill may involve a restaurant skill component ordering pizza with respect to a restaurant's online ordering system, etc.

The natural language processing system 120 may include a TTS component 180 that generates audio data (e.g., synthesized speech conditioned on an input audio condition) from text data using one or more different methods. In one method of synthesis called unit selection, the TTS component 180 matches text data against a database of recorded speech. The TTS component 180 selects matching units of recorded speech and concatenates the units together to form audio data. In another method of synthesis called parametric synthesis, the TTS component 180 varies parameters such as frequency, volume, and noise to create audio data including an artificial speech waveform. Parametric synthesis uses a computerized voice generator, sometimes called a vocoder. In various examples described herein (e.g., in reference to FIGS. 1, 3A, and 3B), the TTS component 180 may use a hierarchical variational autoencoder system (or other machine learning architecture) to generate prosody-rich synthesized speech for various applications.

The natural language processing system 120 may include storage 270. In various examples, storage 270 may include profile data, various machine learning models and/or parameters of such models, contextual data, etc. Various components of the natural language processing system 120 may access data stored in storage 270 in order to perform the various, respective functions of the components.

Figure 3A:
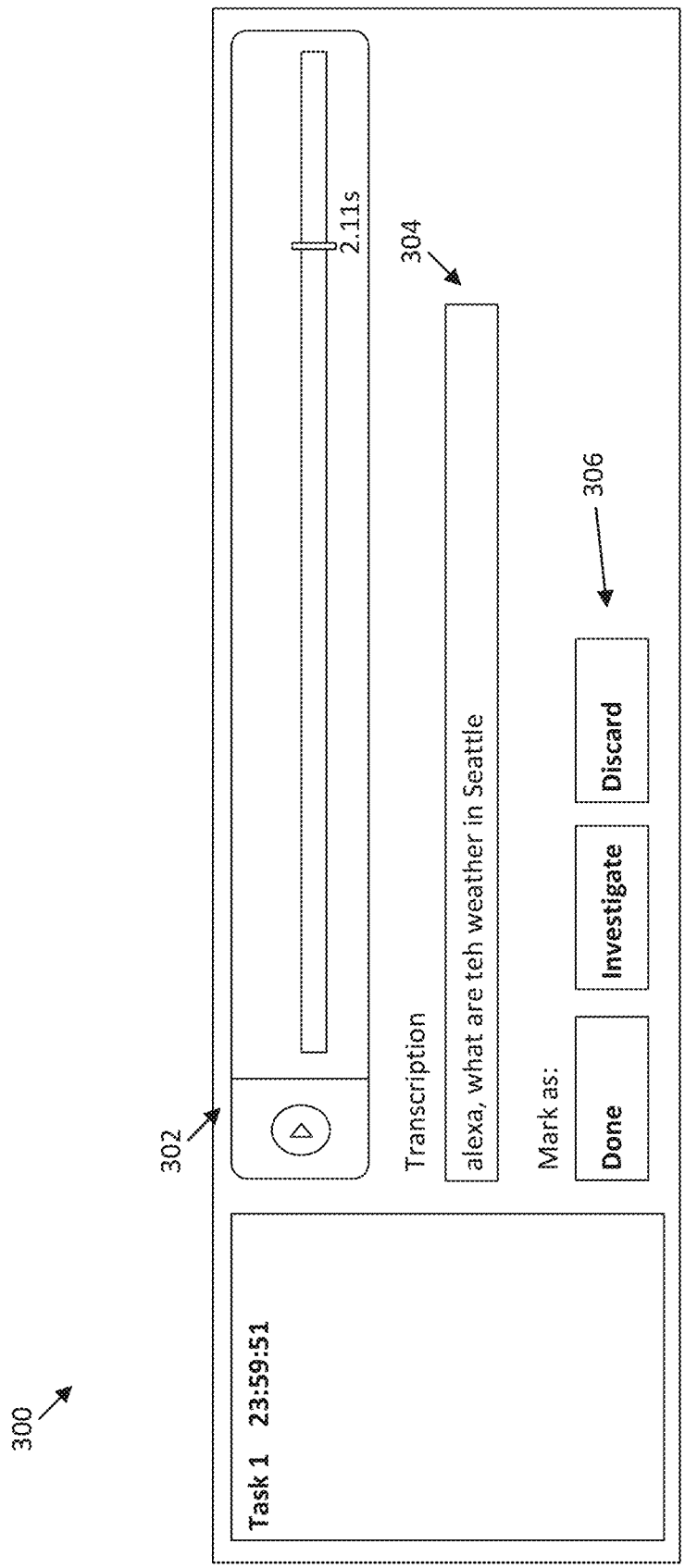
FIG. 3A is a diagram illustrating an example interface for providing transcription labels for input audio data, according to various embodiments of the present disclosure.

FIG. 3A is a diagram illustrating an example interface 300 for providing transcription labels for input audio data, according to various embodiments of the present disclosure. In various examples, the interface 300 may be an interface for labeling data by a human user. For example, the interface 300 may be used by a human user to label input audio data. In such an example, the label may comprise a text transcription of the audio.

For example, the human user (e.g., user 110 of FIG. 1) may control playback of the audio using a playback bar 302. The playback bar 302 may allow the user to start, pause, fast forward, rewind, select playback speed, and/or otherwise control playback of input audio that is to be labeled with a transcription. The user may provide the transcription in field 304. In the current example, the transcription entered in field 304 is "alexa, what are the weather in Seattle". Note that this transcription includes a spelling error and is grammatically incorrect due to incorrect verb conjugation.

Upon completion of the transcription for the audio sample, the user may select a graphical user interface button 306 indicating whether the current label (e.g., transcription) is Done (e.g., completed), or whether it should be investigated by one or more other human users, or whether the current audio sample should be discarded (e.g., such as when the audio sample is noise or is otherwise unintelligible).

Figure 3B:
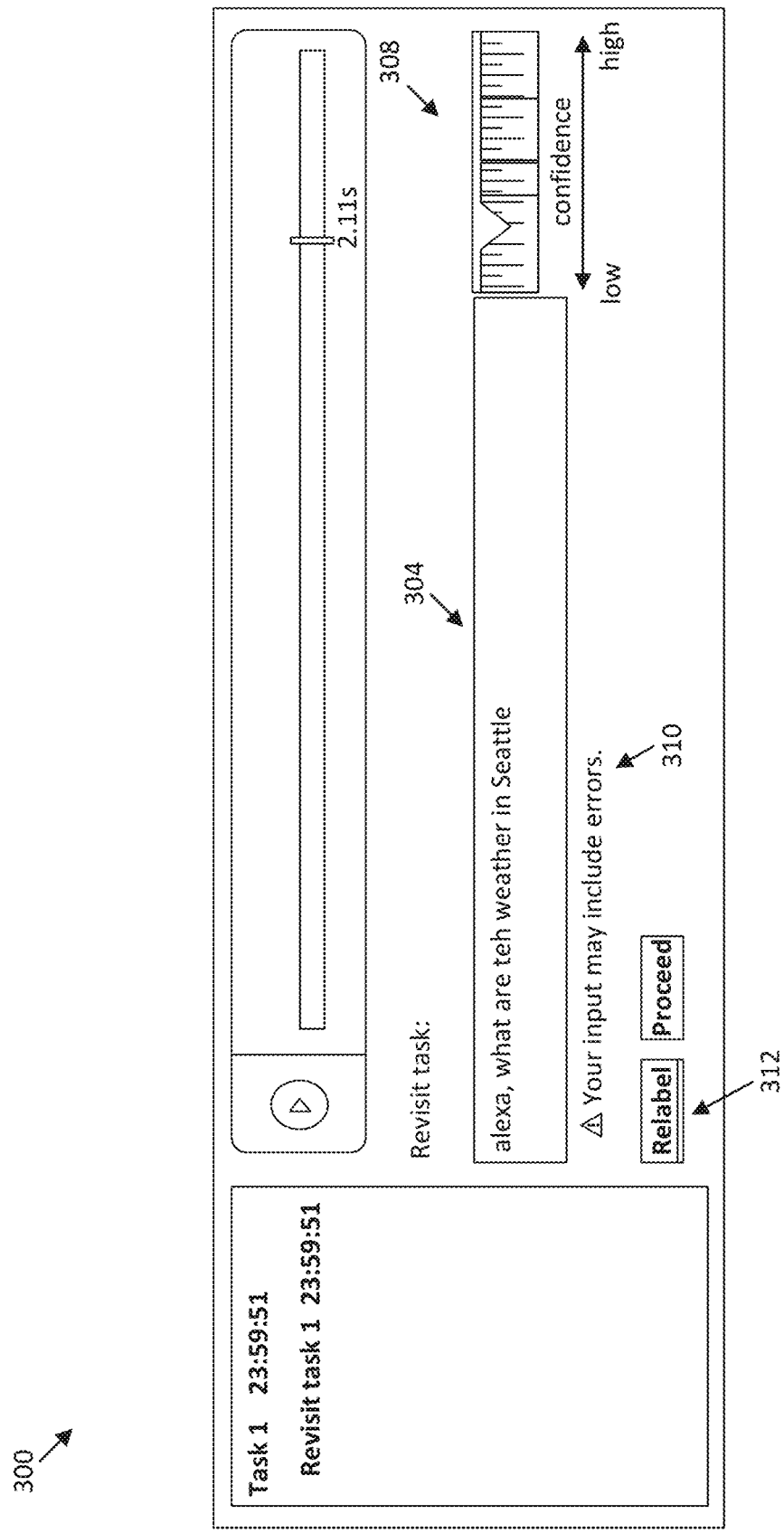
FIG. 3B is a diagram illustrating the example interface of FIG. 3A including a confidence score relevant to the transcription labels, according to various embodiments of the present disclosure.

FIG. 3B is a diagram illustrating the example interface 300 of FIG. 3A including a confidence score relevant to the transcription labels, according to various embodiments of the present disclosure. In FIG. 3B, a confidence score has been generated by the label confidence prediction component 182 for the current label (e.g., for the transcription entered in field 304). In FIG. 3B, a graphical depiction of the confidence score is shown as confidence score indicator 308. The pointer of the confidence score indicator 308 is indicating low confidence, likely due to the misspelling and/or grammatical error in the transcription entered in field 304. However, other factors (represented by feature data input into the machine-learning model 192) may also be contributing to the low confidence score. For example, the user may historically exhibit poor performance during the time at which the transcription was entered and/or the user may have historically poor performance transcribing speech received from a particular geolocation from which the current audio was received.

In the example of FIG. 3B, the low confidence score for the label (graphically represented by confidence score indicator 308) causes an error warning 310 to be displayed and provides graphical control buttons 312 offering the user a chance to edit and/or reevaluate (e.g., "relabel") the transcription. To transition between the interface 300 shown in FIG. 3B and the interface depicted in FIG. 3C, the user may select the graphical control button 312 that states "Relabel."

Figure 3C:
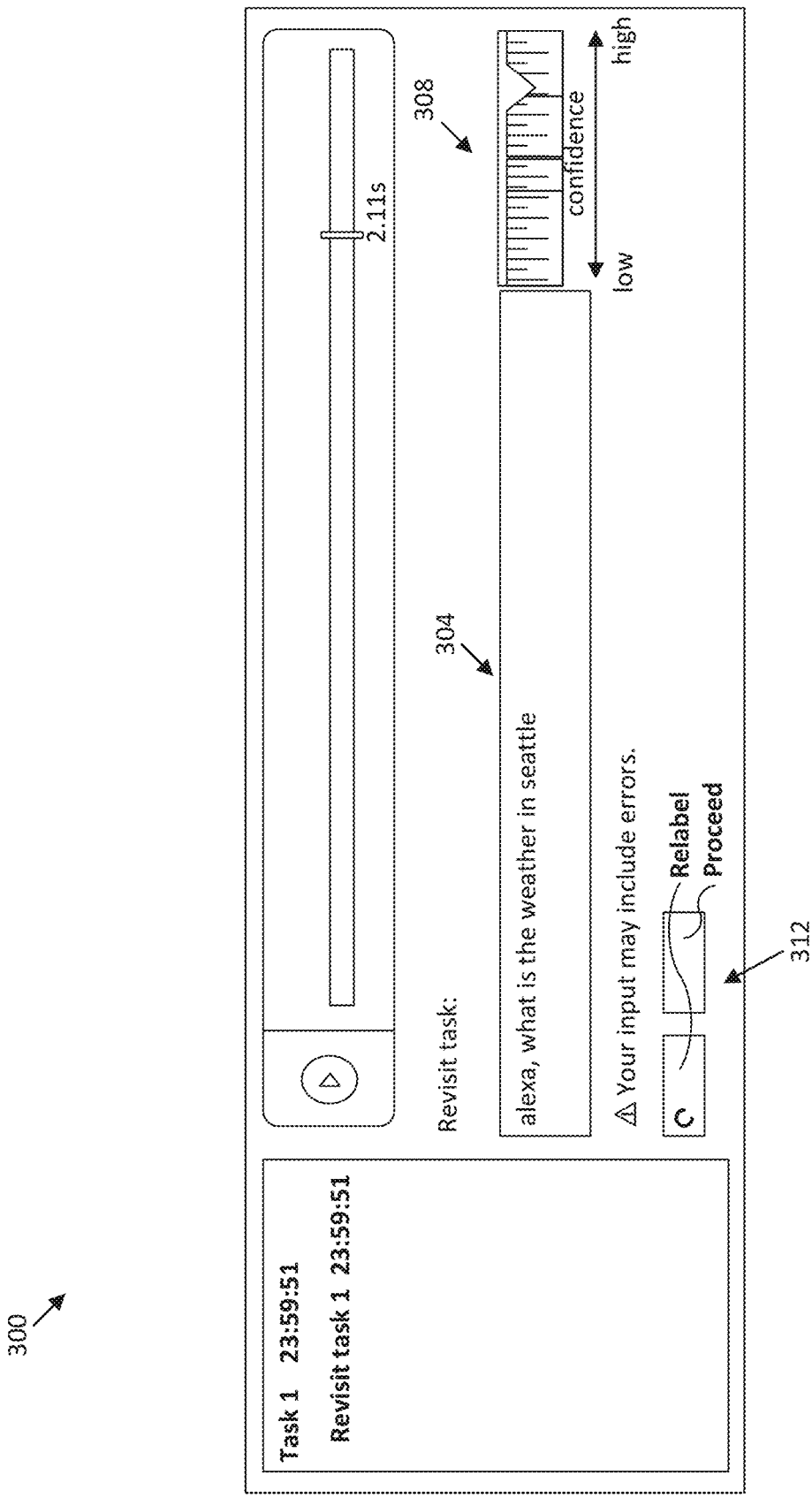
FIG. 3C is a diagram illustrating the example interface of FIGS. 3A and 3B including an updated confidence score relevant to modified transcription labels, according to various embodiments of the present disclosure.

FIG. 3C is a diagram illustrating the example interface 300 of FIGS. 3A and 3B including an updated confidence score relevant to modified transcription labels, according to various embodiments of the present disclosure. In FIG. 3C, the user may re-enter the transcription label. For example, the user may enter the transcription "alexa, what is the weather in seattle." Note that in this modified transcription of the same audio, the user has corrected the spelling error and the verb conjugation error. The confidence score generated by label confidence prediction component 182 for the label has increased from low confidence (FIG. 3B) to high confidence (FIG. 3C). Note that the confidence score may be generated in real time as the user types. Additionally, the confidence score may be re-computed after the complete label has been entered (e.g., after the user clicks on the "Proceed" button). Additionally, in some examples, an initial confidence score may be generated prior to the user providing a label. Such an initial confidence score may represent the likelihood that the human user will generate an accurate label based on the qualities of the audio sample itself, context related to the audio sample, and/or based on past data describing the performance of the user (as described above). In various examples, three different machine learning models may be employed for initial label confidence score generation (e.g., pre-labeling), real-time label confidence score generation, and post-labeling confidence score generation. Although a gauge graphic is shown in the examples of FIGS. 3B, 3C, the confidence score generated for the label may take other forms depending on the desired implementation. For example, a numerical score between 0 and 1 (or between two other values) may be used. After modifying the transcription label (e.g., generating a modified version of the label), the user may select the graphical control button 312 labeled as "Proceed" to continue to FIG. 3D.

Figure 3D:
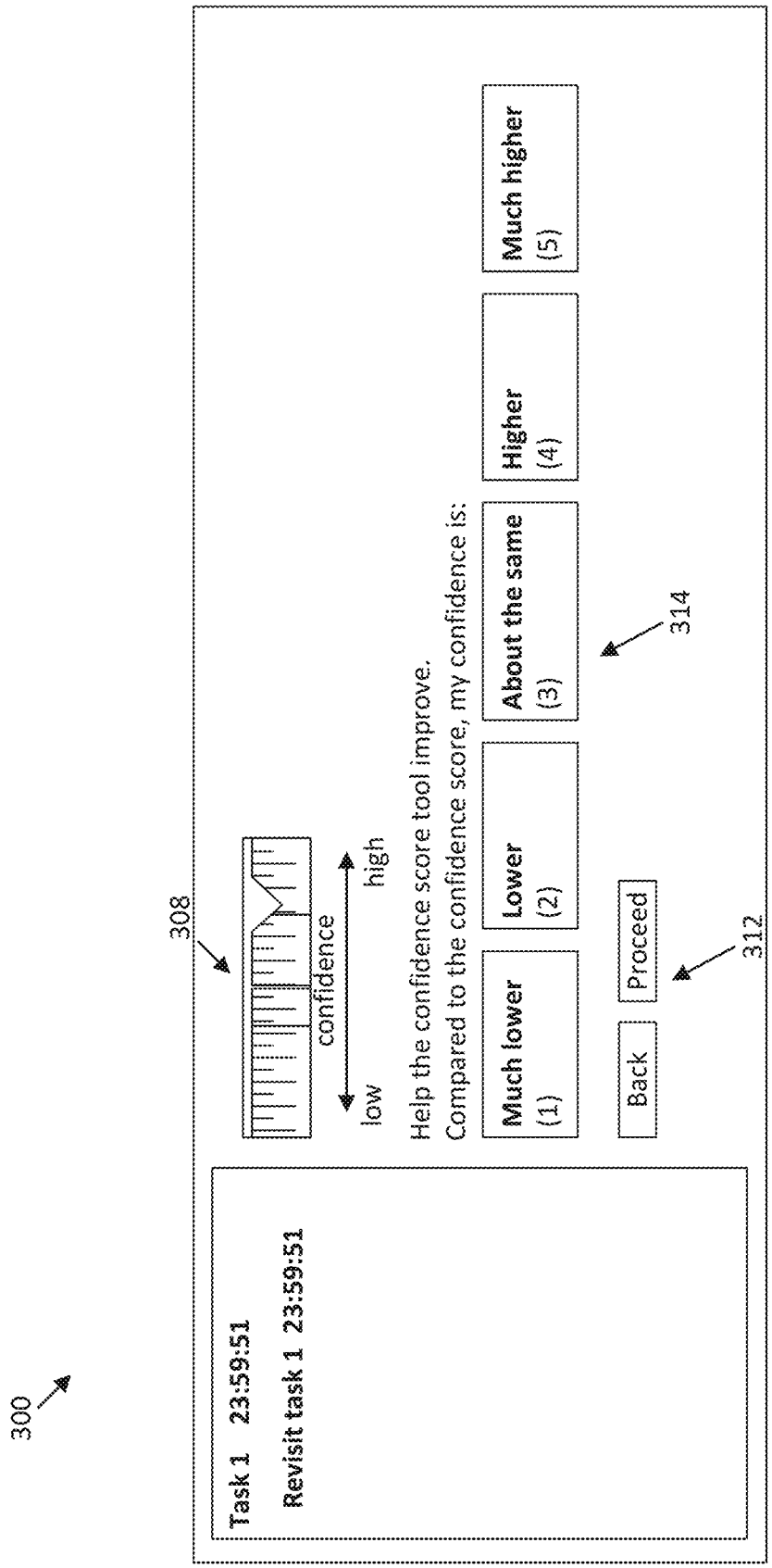
FIG. 3D is a diagram illustrating the example interface of FIGS. 3A, 3B, and 3C including graphical elements effective to solicit user feedback on the predicted confidence score, according to various embodiments of the present disclosure.

FIG. 3D is a diagram illustrating the example interface of FIGS. 3A, 3B, and 3C including graphical elements effective to solicit user feedback on the predicted confidence score, according to various embodiments of the present disclosure. After modification of the label, the label confidence score illustrated by confidence score indicator 308 indicates high confidence in the human generated label for the current sample. At FIG. 3D, the user may be prompted for their reaction to the confidence score output by the confidence score indicator 308 (e.g., output by the label confidence prediction component 182). For example, in FIG. 3D, the user is shown the prompt "Compared to the gauge, my confidence is:" and the user is shown the graphical control buttons 314 from which the user may select their subjective confidence level in the accuracy of their transcription (e.g., labeling) of the current sample. Accordingly, the example depicted in FIG. 3D may offer the user an opportunity to adjust the confidence score and/or provide an assessment of the confidence score. The user's response may be used as a signal to retrain the machine learning model 192 to generate more accurate confidence scores for human-generated labels.

Figure 4:
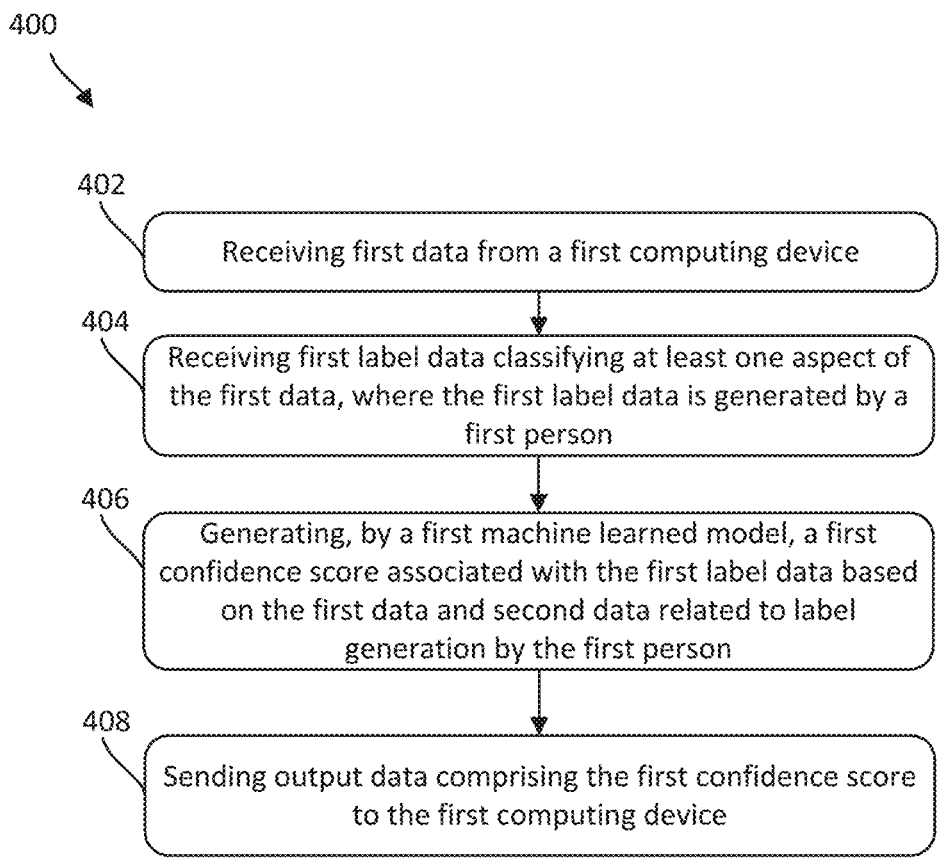
FIG. 4 is a flow chart illustrating an example process for generating label confidence scores, according to various embodiments of the present disclosure.

FIG. 4 is a flow chart illustrating an example process 400 for generating label confidence scores, according to various embodiments of the present disclosure. Those actions in FIG. 4 that have been previously described in reference to FIGS. 1-3 may not be described again herein for purposes of clarity and brevity. The actions of the process depicted in the flow diagram of FIG. 4 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure.

Process 400 may begin at action 402, at which first data may be received from a first computing device. In various examples, the label confidence prediction component 182 may be implemented as web service where an application programming interface (API) may receive data to be labeled and/or may receive data that has been labeled remotely (by a human user), such as data/metadata 176. Any type of data may be received at action 402. For example, audio data and/or metadata associated with the audio data may be received, as described in various examples herein. In other examples, images that are to be labeled may be received and/or metadata related to the images. In general, any data that is to be labeled by a human user may be received at action 402.

Process 400 may continue at action 404, at which first label data classifying at least one aspect of the first data may be received. The first label data may be generated by a first person (e.g., by a human user). At action 404, the label confidence prediction component 182 may receive the label generated by the human user for the first data received at action 402. For example, the first data of action 402 may be audio data representing human speech and the first label data of action 404 may be a transcription of the audio data. In another example, the first data of action 402 may be an image and the first label data of action 404 may be a classification of an object present in the image and/or bounding box data identifying the location of the classified object within the image. As previously described, the first label data may be provided continuously as a user types or otherwise inputs the first label data. Accordingly, the label confidence scores being generated may be provided in real-time as the user inputs the first label data on the basis of what has been input by the user thus far.

Processing may continue at action 406, at which a first machine learning model may generate a first confidence score associated with the first label data based on the first data and second data related to label generation by the first person. At action 406, the various feature data computed for the first data received at action 402 and based on past processing by the first person (e.g., the user) may be input into the first machine learning model. The first machine learning model may be trained to output a confidence score for the first label data received at action 404, based on the input feature data.

For example, the first data may include and/or may be used to generate various feature data. For example, if the labeling task is transcribing audio data, feature data may include features that describe the conditions under which an utterance represented by the audio data was captured, such as device type of the device capturing the audio, geolocation information of the device capturing the audio, a natural language processing component requesting the first label data, etc. In some other examples, features that describe the audio data itself may be included in the first data and/or generated using the first data. For example, the raw audio data and/or properties thereof (e.g., duration) may be used as a feature, output data from ASR component 250 (e.g., a text transcription of the utterance generated by ASR component 250) may be used as a feature, NLU output data generated by NLU component 260 (e.g., intent data representing a semantic interpretation of the utterance) may be used as a feature, etc. In some other examples, features that describe interactions between a user providing the utterance and the natural language processing system may be used as features. For example, the action taken by the natural language processing system 120 (and/or a skill component 290 thereof) may be used as a feature, responses output by TTS component 180 in response to the utterance may be used as a feature, etc.

In some other examples, features that describe the condition under which the first label data was created may be included and/or computed from the first data for ingestion by the first machine learned model. For example, a location of the user 110 generating the label, a job identifier of the user 110 generating the label, a tenure of the user 110 generating the label, a performance record of the user 110 (e.g., label accuracy statistics) for the data-labeling task, etc., may be used as input features to the first machine learning model. In yet other examples, features that are derived from the label itself and/or tags appended thereto by the user 110 may be used as features. For example, as the first confidence score may be generated in real time, a feature may be the label provided by the user 110 so far. Another example feature included in and/or computed from the first data may include an assessment by the user 110 of a speaker of the utterance's native language (e.g., a feature indicating whether the speaker is a native speaker of a language of the utterance).

In yet other examples, features that describe the user 110's labeling process may be included and/or computed from the first data for ingestion by the first machine learned model. Examples of such features may include an amount of time the user 110 has been considering the current utterance, whether the user 110 used hotkeys and/or an internet search during the labeling of the current utterance, a time of day at which the labeling occurred, etc.

As previously described, in some cases the various features may be pre-processed (e.g., by creating a numerical representation of the various features) and may be input into the first machine learned model. In some cases, the first machine learned model may be instantiated as an ensemble of binary decision trees. In such cases, some of the binary decision trees may be specific to certain features of the input features. The ensemble of binary decision trees may be used to perform regression to determine the label confidence score. In other examples, a neural network and/or other deep learning network may take the features as input and may be trained to output a confidence score based on the various features input to the network. In some cases, a language model (e.g., a transformer-based model such as BERT) may be used to assess the coherence of the label data generated by the user 110 on the basis of past labels and based on the contextual understanding of the language learned by the language model. For example, a language model trained for error detection (e.g., in a particular language) may be used to determine a score for the label that indicates the relative coherence of the label. The score output by the language model may be used as a feature in generating the label confidence score.

Processing may continue at action 408, at which output data comprising the first confidence score may be sent to the first computing device. In various examples, the first confidence score for the first label data may be sent back to the computing device that requested the confidence score for the human-labeled data. In some examples, the label confidence score may be used to determine whether the human-labeled data is of sufficient quality to use for training a machine learning model.

Figure 5:
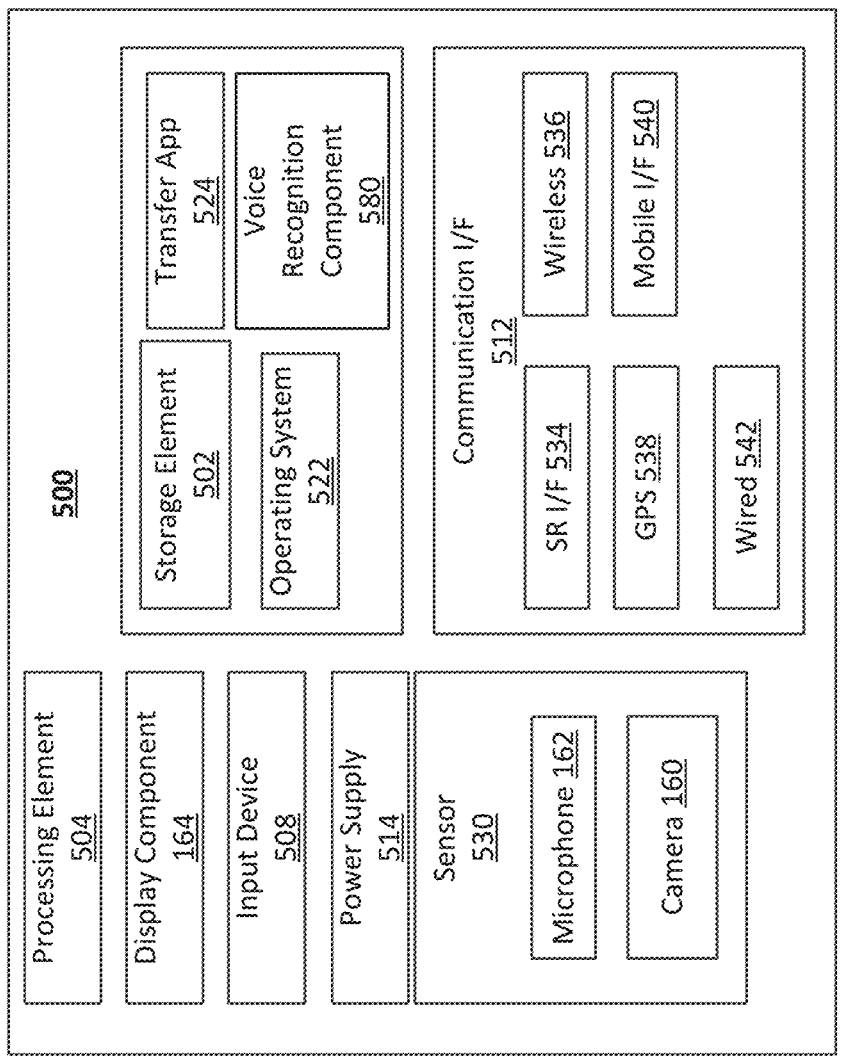
FIG. 5 is a block diagram showing an example system of a computing device that may be used in accordance with various embodiments described herein.

FIG. 5 is a block diagram showing an example system 500 of a computing device that may be used to implement, at least in part, one or more of the components described herein for label confidence scoring, in accordance with various aspects of the present disclosure. It will be appreciated that not all devices will include all of the components of the system 500 and some user devices may include additional components not shown in the system 500. The system 500 may include one or more processing elements 504 for executing instructions and retrieving data stored in a storage element 502. The processing element 504 may comprise at least one processor. Any suitable processor or processors may be used. For example, the processing element 504 may comprise one or more digital signal processors (DSPs), tensor processing units, graphical processing units, etc. In some examples, the processing element 504 may be effective to determine a wakeword and/or to stream audio data to natural language processing system 120. The storage element 502 can include one or more different types of memory, data storage, or computer-readable storage media devoted to different purposes within the system 500. For example, the storage element 502 may comprise flash memory, random-access memory, disk-based storage, etc. Different portions of the storage element 502, for example, may be used for program instructions for execution by the processing element 504, storage of images or other digital works, and/or a removable storage for transferring data to other devices, etc.

The storage element 502 may also store software for execution by the processing element 504. An operating system 522 may provide the user with an interface for operating the computing device and may facilitate communications and commands between applications executing on the system 500 and various hardware thereof. A transfer application 524 may be configured to receive images, audio, and/or video from another device (e.g., a mobile device, image capture device, and/or display device) or from an image sensor and/or microphone included in the system 500. In some examples, the transfer application 524 may also be configured to send the received voice requests to one or more voice recognition servers (e.g., natural language processing system 120).

When implemented in some user devices, the system 500 may also comprise a display component 164. The display component 164 may comprise one or more light-emitting diodes (LEDs) or other suitable display lamps. Also, in some examples, the display component 164 may comprise, for example, one or more devices such as cathode ray tubes (CRTs), liquid-crystal display (LCD) screens, gas plasma-based flat panel displays, LCD projectors, raster projectors, infrared projectors or other types of display devices, etc. As described herein, display component 164 may be effective to display content determined provided by a skill executed by the processing element 504 and/or by another computing device.

The system 500 may also include one or more input devices 508 operable to receive inputs from a user. The input devices 508 can include, for example, a push button, touch pad, touch screen, wheel, joystick, keyboard, mouse, trackball, keypad, light gun, game controller, or any other such device or element whereby a user can provide inputs to the system 500. These input devices 508 may be incorporated into the system 500 or operably coupled to the system 500 via wired or wireless interface. In some examples, system 500 may include a microphone or an array of microphones for capturing sounds, such as voice requests. A voice recognition component 580 may interpret audio signals of sound captured by microphone. In some examples, voice recognition component 580 may listen for a "wakeword" to be received by microphone 162. Upon receipt of the wakeword, voice recognition component 580 may stream audio to a voice recognition server for analysis, such as natural language processing system 120. In various examples, voice recognition component 580 may stream audio to external computing devices via communication interface 512.

When the display component 164 includes a touch-sensitive display, the input devices 508 can include a touch sensor that operates in conjunction with the display component 164 to permit users to interact with the image displayed by the display component 164 using touch inputs (e.g., with a finger or stylus). The system 500 may also include a power supply 514, such as a wired alternating current (AC) converter, a rechargeable battery operable to be recharged through conventional plug-in approaches, or through other approaches such as capacitive or inductive charging.

The communication interface 512 may comprise one or more wired or wireless components operable to communicate with one or more other computing devices. For example, the communication interface 512 may comprise a wireless communication module 536 configured to communicate on a network, such as a computer communication network, according to any suitable wireless protocol, such as IEEE 802.11 or another suitable wireless local area network (WLAN) protocol. A short range interface 534 may be configured to communicate using one or more short range wireless protocols such as, for example, near field communications (NFC), Bluetooth, Bluetooth LE, etc. A mobile interface 540 may be configured to communicate utilizing a cellular or other mobile protocol. A Global Positioning System (GPS) interface 538 may be in communication with one or more earth-orbiting satellites or other suitable position-determining systems to identify a position of the system 500. A wired communication module 542 may be configured to communicate according to the USB protocol or any other suitable protocol. The system 500 may also include one or more sensors 530 such as, for example, one or more position sensors, camera(s) 160, and/or motion sensors.

Figure 6:
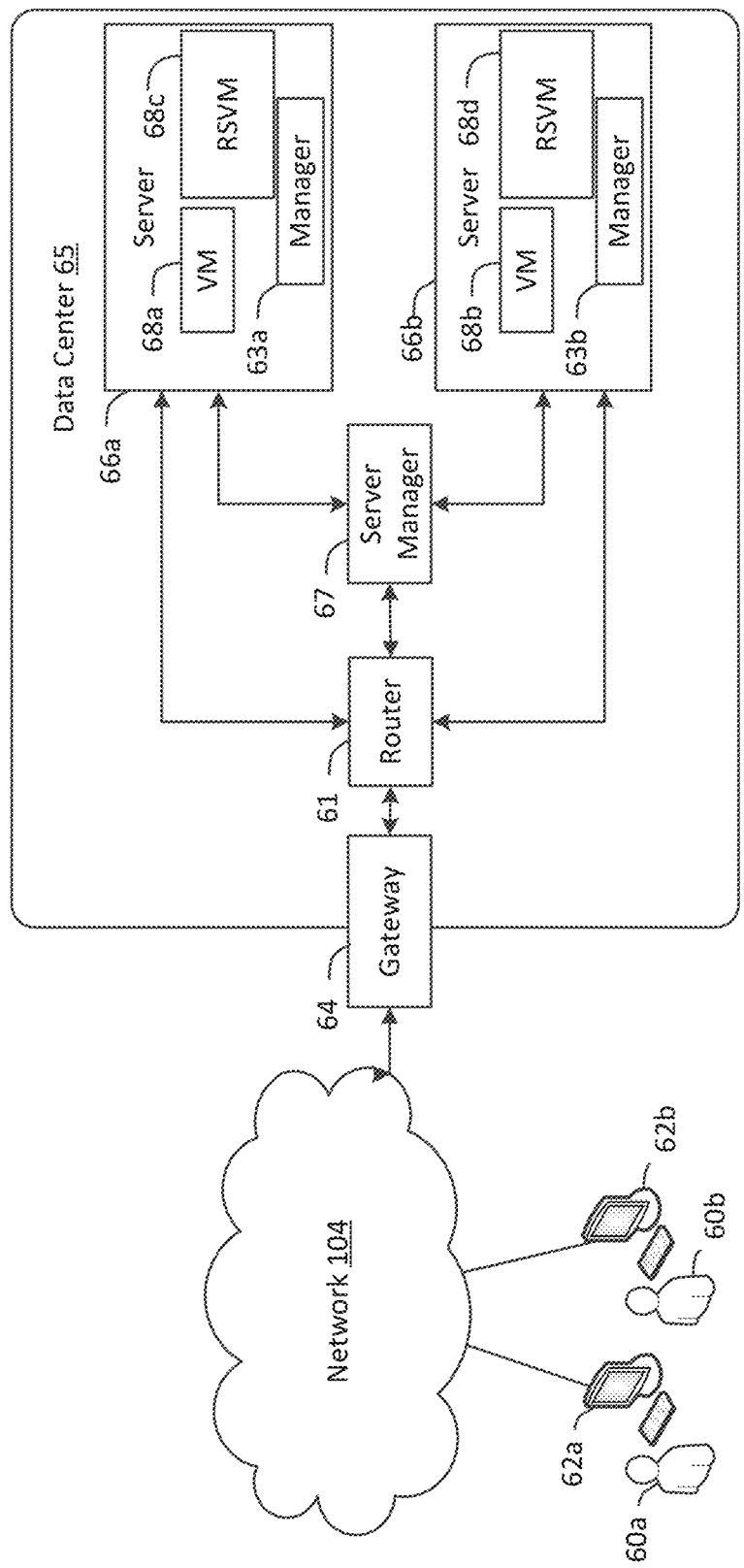
FIG. 6 is a diagram illustrating an example system for sending and providing data that may be used in accordance with the present disclosure.

FIG. 6 is a diagram illustrating an example system for sending and providing data that may be used in accordance with the present disclosure. In particular, FIG. 6 illustrates an example computing environment in which the embodiments described herein may be implemented. For example, the computing environment of FIG. 6 may be used to provide the various machine learning models described herein as a service over a network wherein one or more of the techniques described herein may be requested by a first computing device and may be performed by a different computing device configured in communication with the first computing device over a network. FIG. 6 is a diagram schematically illustrating an example of a data center 65 that can provide computing resources to users 60a and 60b (which may be referred herein singularly as user 60 or in the plural as users 60) via user computers 62a and 62b (which may be referred herein singularly as user computer 62 or in the plural as user computers 62) via network 104. Data center 65 may be configured to provide computing resources for executing applications on a permanent or an as-needed basis. The computing resources provided by data center 65 may include various types of resources, such as gateway resources, load balancing resources, routing resources, networking resources, computing resources, volatile and nonvolatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. In various examples, the instances may be configured to execute one or more of the various machine learning techniques described herein.

These services may be configurable with set or custom applications and may be configurable in size, execution, cost, latency, type, duration, accessibility and in any other dimension. These web services may be configured as available infrastructure for one or more clients and can include one or more applications configured as a system or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 65 may include servers 66a and 66b (which may be referred herein singularly as server 66 or in the plural as servers 66) that provide computing resources. These resources may be available as bare metal resources or as virtual machine instances 68a-d (which may be referred herein singularly as virtual machine instance 68 or in the plural as virtual machine instances 68). In at least some examples, server manager 67 may control operation of and/or maintain servers 66. Virtual machine instances 68c and 68d are rendition switching virtual machine ("RSVM") instances. The RSVM virtual machine instances 68c and 68d may be configured to perform all, or any portion, of the techniques for improved rendition switching and/or any other of the disclosed techniques in accordance with the present disclosure and described in detail above. As should be appreciated, while the particular example illustrated in FIG. 6 includes one RSVM virtual machine in each server, this is merely an example. A server may include more than one RSVM virtual machine or may not include any RSVM virtual machines.

The availability of virtualization technologies for computing hardware has afforded benefits for providing large-scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 6, network 104 may, for example, be a publicly accessible network of linked networks and possibly operated by various distinct parties, such as the Internet. In other embodiments, network 104 may be a private network, such as a corporate or university network that is wholly or partially inaccessible to non-privileged users. In still other embodiments, network 104 may include one or more private networks with access to and/or from the Internet.

Network 104 may provide access to user computers 62. User computers 62 may be computers utilized by users 60 or other customers of data center 65. For instance, user computer 62a or 62b may be a server, a desktop or laptop personal computer, a tablet computer, a wireless telephone, a personal digital assistant (PDA), an e-book reader, a game console, a set-top box or any other computing device capable of accessing data center 65. User computer 62a or 62b may connect directly to the Internet (e.g., via a cable modem or a Digital Subscriber Line (DSL)). Although only two user computers 62a and 62b are depicted, it should be appreciated that there may be multiple user computers.

User computers 62 may also be utilized to configure aspects of the computing resources provided by data center 65. In this regard, data center 65 might provide a gateway or web interface through which aspects of its operation may be configured through the use of a web browser application program executing on user computer 62. Alternately, a stand-alone application program executing on user computer 62 might access an application programming interface (API) exposed by data center 65 for performing the configuration operations. Other mechanisms for configuring the operation of various web services available at data center 65 might also be utilized.

Servers 66 shown in FIG. 6 may be servers configured appropriately for providing the computing resources described above and may provide computing resources for executing one or more web services and/or applications. In one embodiment, the computing resources may be virtual machine instances 68. In the example of virtual machine instances, each of the servers 66 may be configured to execute an instance manager 63a or 63b (which may be referred herein singularly as instance manager 63 or in the plural as instance managers 63) capable of executing the virtual machine instances 68. The instance managers 63 may be a virtual machine monitor (VMM) or another type of program configured to enable the execution of virtual machine instances 68 on server 66, for example. As discussed above, each of the virtual machine instances 68 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 65 shown in FIG. 6, a router 61 may be utilized to interconnect the servers 66a and 66b. Router 61 may also be connected to gateway 64, which is connected to network 104. Router 61 may be connected to one or more load balancers, and alone or in combination may manage communications within networks in data center 65, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 65 shown in FIG. 6, a data center 65 is also employed to at least in part direct various communications to, from and/or between servers 66a and 66b. While FIG. 6 depicts router 61 positioned between gateway 64 and data center 65, this is merely an exemplary configuration. In some cases, for example, data center 65 may be positioned between gateway 64 and router 61. Data center 65 may, in some cases, examine portions of incoming communications from user computers 62 to determine one or more appropriate servers 66 to receive and/or process the incoming communications. Data center 65 may determine appropriate servers to receive and/or process the incoming communications based on factors such as an identity, location or other attributes associated with user computers 62, a nature of a task with which the communications are associated, a priority of a task with which the communications are associated, a duration of a task with which the communications are associated, a size and/or estimated resource usage of a task with which the communications are associated and many other factors. Data center 65 may, for example, collect or otherwise have access to state information and other information associated with various tasks in order to, for example, assist in managing communications and other operations associated with such tasks.

It should be appreciated that the network topology illustrated in FIG. 6 has been greatly simplified and that many more networks and networking devices may be utilized to interconnect the various computing systems disclosed herein. These network topologies and devices should be apparent to those skilled in the art.

It should also be appreciated that data center 65 described in FIG. 6 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, used to implement and distribute the infrastructure and web services offered by the provider network. The resources may in some embodiments be offered to clients in various units related to the web service, such as an amount of storage capacity for storage, processing capability for processing, as instances, as sets of related services, and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, for example, computer servers, storage devices, network devices, and the like. In some embodiments, a client or user may be provided direct access to a resource instance, e.g., by giving a user an administrator login and password. In other embodiments, the provider network operator may allow clients to specify execution requirements for specified client applications and schedule execution of the applications on behalf of the client on execution systems (such as application server instances, Java™ virtual machines (JVMs), general-purpose or special-purpose operating systems that support various interpreted or compiled programming languages such as Ruby, Perl, Python, C, C++, and the like, or high-performance computing systems) suitable for the applications, without, for example, requiring the client to access an instance or an execution system directly. A given execution system may utilize one or more resource instances in some implementations; in other implementations, multiple execution systems may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware system, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments, the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Figure 7:
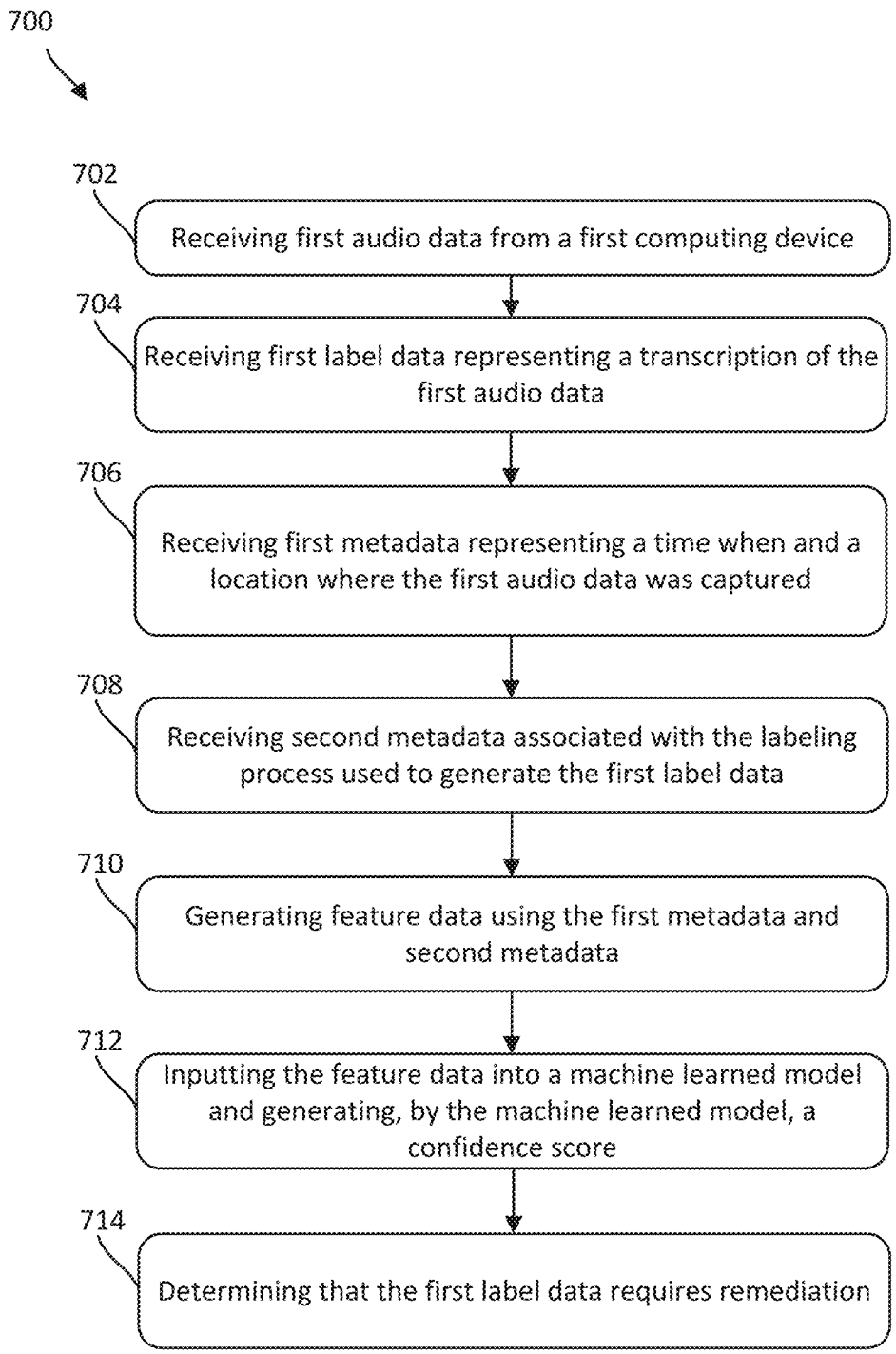
FIG. 7 is a flow chart illustrating an example process for determining that input label data is to be remediated in accordance with various aspects of the present disclosure.

FIG. 7 is a flow chart illustrating an example process 700 for determining that input label data is to be remediated in accordance with various aspects of the present disclosure. Those actions in FIG. 7 that have been previously described in reference to FIGS. 1-6 may not be described again herein for purposes of clarity and brevity. The actions of the process depicted in the flow diagram of FIG. 7 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure.

Processing may begin at action 702 at which first audio data may be received from a first computing device. For example, first audio data representing a user-spoken utterance may be received (e.g., from a speech-processing enabled device). The first audio data may include a command and/or request (e.g., a user command to play music, to turn on a light, to arm an alarm system, to adjust a thermostat, a user question, etc.).

Processing may continue at action 704 at which first label data representing a transcription of the first audio data may be received. For example, a user that is tasked with transcribing audio data to generate transcriptions (e.g., text) representing the utterance of the first audio data may generate first label data. The first label data may represent the user's transcription of the speech present in the first audio data (if any). In various examples, the user may be tasked with generating such transcription labels in order to generate training data used to train supervised and/or semi-supervised machine learning models. For example, the label data may be used to determine the loss during training of an automatic speech recognition and/or natural language understanding machine learning model.

Processing may continue at action 706, at which first metadata representing a time when and a location where the first audio data was captured may be received. For example, the first metadata may include geolocation data indicating a location of the device that captured the first audio data received at action 702. Additionally, the first metadata may include first timestamp data indicating a time (and/or date) at which the device captured the first audio data received at action 702. Any other metadata that is related to the first audio data may also be generated and/or received at action 706. For example, a duration of the first audio data, a text transcription output by ASR component 250, a classification of the type of request included in the first audio data, a user account associated with the first audio data, etc. In general, the first metadata received at action 706 relates to the first audio data (e.g., the data being labeled by the first label data) as opposed to relating to the label generation process. The specific information included in the first metadata is implementation dependent.

Processing may continue at action 708, at which second metadata associated with the labeling process used to generate the first label data may be received. For example, the second metadata may describe a historical accuracy of labels generated by a particular user that generated the first label data. In another example, the second metadata may include information such as a length of time elapsed during the generation of the first label data, a number of times that the first audio data was played back, rewound, and/or started over during generation of the first label data, whether any hot keys were used during generation of the first label data, adherence of the first label data to canonical grammar structures (e.g., determined using a language model), etc. In general, the second metadata received at action 708 relates to the labeling process used when generating the first label data received at action 704. The specific information included in the second metadata is implementation dependent.

Processing may continue at action 710, at which feature data may be generated using the first metadata and the second metadata. For example, the first metadata, second metadata, and any other data used to generate features for input into machine learning model(s) 192 (FIG. 1) may be preprocessed to be of a form that is required for input into the machine learning model(s) 192. For example, a duration of time elapsed during the labeling process may be combined with a number of times that the first audio data was replayed (e.g., according to an equation) to be represented as a combined feature.

Processing may continue at action 712, at which the feature data generated at action 710 may be input into a machine learned model (e.g., machine learning model(s) 192 of FIG. 1). The machine learned model may be trained to generate a confidence score that represents a predicted accuracy of the first label data (e.g., an accuracy of a transcription of the first audio data). The confidence score may be predicted on the basis of the various metadata and features described herein.

Processing may continue at action 714, at which a determination may be made, based on the confidence score, that the first label data requires remediation. For example, the confidence score output by the machine learned model may be below a threshold confidence score and/or may be a statistical outlier with respect to other confidence scores generated for other (e.g., similar) label data. In some examples, if remediation is required, the first audio data may be sent to the same user and/or another user and/or automatic labeling system for re-labeling.

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A computer-implemented method, comprising:
receiving first data representing first human speech;
receiving, by a first computing device from a first user, first label data comprising a transcription of at least a portion of the first human speech, wherein the first user is a human user;
generating first feature data representing at least one of a time when or a location where a second computing device received the first human speech using at least one microphone of the second computing device, wherein the second computing device is a speech processing-enabled device;
generating second feature data representing past transcription performance of the first user, wherein the past transcription performance comprises a historical accuracy of transcriptions generated by the first user;
generating third feature data representing actions taken by the first user while generating the transcription, wherein the third feature data comprises data indicating that the first user executed an internet search during transcription;
determining, by a first machine learning model using the first feature data, the second feature data, and the third feature data, a first confidence score representing a confidence in an accuracy of the first label data;
generating an updated automatic speech recognition (ASR) model of a natural language processing system using the first data, the first label data, and the first confidence score; and
generating an updated first machine learning model based on a difference between the first confidence score and at least one other confidence score determined for the first label data.

2. The computer-implemented method of claim 1, further comprising:
receiving second data representing second human speech;
generating fourth feature data representing at least one of the time when or the location where a third computing device received the second human speech using at least one microphone of the third computing device;
generating, by a second machine learning model using the second data and the fourth feature data, a prediction score indicating a likelihood that the first data will be accurately labeled by any human user; and
excluding the second data from data being sent to users for labeling.

3. The computer-implemented method of claim 1, further comprising:
sending the first confidence score to the first user; and
receiving, from the first user, a second confidence score representing a comparative confidence score representing an assessment of the first confidence score, wherein the updated first machine learning model is further generated based at least in part on the second confidence score.

4. A method comprising:
receiving first audio data from a first computing device, the first audio data comprising speech;
receiving, from a first annotator device operated by a human user, first label data classifying at least one aspect of the first audio data;
receiving first metadata associated with a series of actions performed on the first annotator device during a labeling process and indicating how the first label data was generated for the first audio data;

receiving second metadata describing at least one aspect of the first audio data;

determining, using the first metadata, the second metadata, and a first machine learning model, first output data indicating a confidence that the first label data generated by the first annotator device during the labeling process is accurate with respect to how the first label data classifies the at least one aspect of the first audio data;

removing the first audio data and the first label data from first training data based at least in part on the first output data;

generating an updated second machine learning model based at least in part on the first training data; and displaying the first output data indicating the confidence on the first annotator device prior to display of a subsequent annotation task on the first annotator device.

5. The method of claim 4, further comprising determining the first metadata based at least in part on past performance data related to past labeling of data by the human user that generated the first label data, wherein the past performance data indicates a historical accuracy of label data generated by the human user.

6. The method of claim 4, further comprising:
determining the second metadata comprising at least one of a time at which the first audio data was generated or a location associated with generation of the first audio data, wherein the first output data is generated by the first machine learning model further based at least in part on the second metadata.

7. The method of claim 4, further comprising:
generating, by a third machine learning model, prior to the receiving the first label data, a prediction score indicating a likelihood that the first audio data will be accurately labeled by a user; and
sending the prediction score to a computing device associated with the user.

8. The method of claim 4, further comprising:
receiving second data from the first computing device;
receiving second label data classifying at least one aspect of the second data;
receiving third metadata associated with how the second label data was generated; and
determining, using the third metadata and the first machine learning model, second output data indicating that the second label data is to be remediated.

9. The method of claim 8, further comprising:
sending the second output data to a second computing device associated with a user that generated the second label data;
receiving, from the second computing device, third label data representing a modification of the second label data; and
determining, by the first machine learning model, third output data indicating that the third label data is accurate.

10. The method of claim 4, further comprising:
receiving the first audio data from an automatic speech recognition component implemented by at least the first computing device;
receiving, from the automatic speech recognition component, second label data representing a transcription of the first data; and determining, by the first machine learning model, the first output data further based at least in part on the second label data.

11. The method of claim 4, further comprising:
receiving second audio data from a second computing device;
receiving second label data classifying at least one aspect of the second audio data;
receiving third metadata associated with at least one of the second audio data and labeling of the second audio data;
determining, by the first machine learning model, second output data indicating that the second label data is to be remediated;
sending the second audio data to a third computing device different from the second computing device based at least in part on the second output data indicating that the second label data is to be remediated;
receiving, from the third computing device, second label data;
determining that the second label data corresponds to the first label data;
sending third data indicating that the second label data corresponds to the first label data to the first machine learning model; and
generating, by the first machine learning model, second output data associated with the second label data based at least in part on the third data, wherein the second output data indicates that the second label data is accurate.

12. The method of claim 4, further comprising receiving third metadata describing the first audio data, wherein the first output data is further determined using the third metadata.

13. The method of claim 4, further comprising:
determining, by a third machine learning model prior to receiving the first label data, that the first audio data relates to a first topic;
determining that a second computing device is associated with labeling data of the first topic; and
sending the first audio data to the second computing device, wherein the second computing device generates the first label data.

14. The method of claim 4, further comprising determining that a transcription of audio was modified a first number of times during transcription, wherein the first metadata comprises data representing modification of the transcription the first number of times.

15. A system comprising:
at least one processor; and
non-transitory computer-readable memory storing instructions that, when executed by the at least one processor, are effective to:
receive first audio data from a first computing device, the first audio data comprising speech;
receive, from a first annotator device operated by a human user, first label data classifying at least one aspect of the first audio data;
receive first metadata associated with a series of actions performed on the first annotator device during a labeling process and indicating how the first label data was generated for the first data;
receive second metadata describing at least one aspect of the first audio data;
determine, using the first metadata, the second metadata, and a first machine learning model, first output data indicating that the first label data generated by the first annotator device during the labeling process is accurate with respect to how the first label data classifies the at least one aspect of the first audio data;

remove the first audio data and the first label data from first training data based at least in part on the first output data;

generate an updated second machine learning model based at least in part on the first training data; and display the first output data on the first annotator device prior to display of a subsequent annotation task on the first annotator device.

16. The system of claim 15, the non-transitory computer-readable memory storing further instructions that, when executed by the at least one processor, are further effective to:

determine the first metadata based at least in part on past performance data related to past labeling of data by the human user that generated the first label data, wherein the past performance data indicates a historical accuracy of label data generated by the human user.

17. The system of claim 15, the non-transitory computer-readable memory storing further instructions that, when executed by the at least one processor, are further effective to:

determine the second metadata comprising at least one of a time at which the first data was generated or a location associated with generation of the first data, wherein the first output data is generated by the first machine learning model further based at least in part on the second metadata.

18. The system of claim 15, the non-transitory computer-readable memory storing further instructions that, when executed by the at least one processor, are further effective to:

generate, by a third machine learning model, prior to the receiving the first label data, a prediction score indicating a likelihood that the first audio data will be accurately labeled by a user; and send the prediction score to a computing device associated with the user.

19. The system of claim 15, the non-transitory computer-readable memory storing further instructions that, when executed by the at least one processor, are further effective to:

receive second data from a second computing device;

receive second label data classifying at least one aspect of the second data;

receive third metadata associated with how the second label data was generated; and determine, using the third metadata and the first machine learning model, second output data indicating that the second label data is to be remediated.

20. The system of claim 19, the non-transitory computer-readable memory storing further instructions that, when executed by the at least one processor, are further effective to:

send the second output data to a second computing device associated with a user that generated the second label data;

receive, from the second computing device, third label data representing a modification of the second label data; and determine, by the first machine learning model, third output data indicating that the third label data is accurate.

21. The system of claim 15, wherein the non-transitory computer-readable memory stores further instructions that, when executed by the at least one processor, are further effective to:

receive the first audio data from an automatic speech recognition component implemented by at least the first computing device;

receive, from the automatic speech recognition component, second label data representing a transcription of the first data; and determine, by the first machine learning model, the first output data further based at least in part on the second label data.

22. The system of claim 15, wherein the first metadata comprises data representing a first number of times that a transcription of audio data was modified during transcription.

* * * * *